April 20, 1954     W. R. AYRES     2,676,253
ELECTRONIC COMPARING CIRCUIT
Filed Jan. 30, 1952
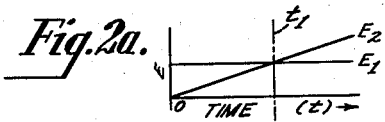
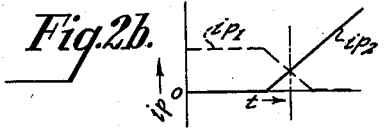
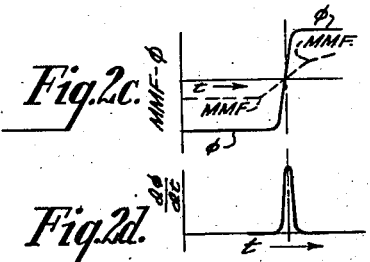
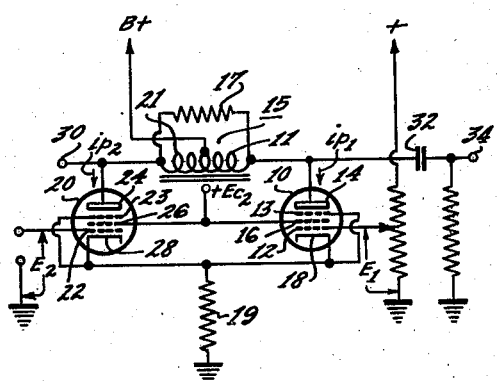
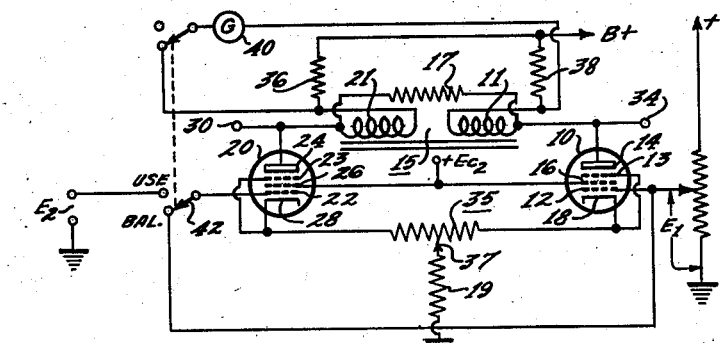
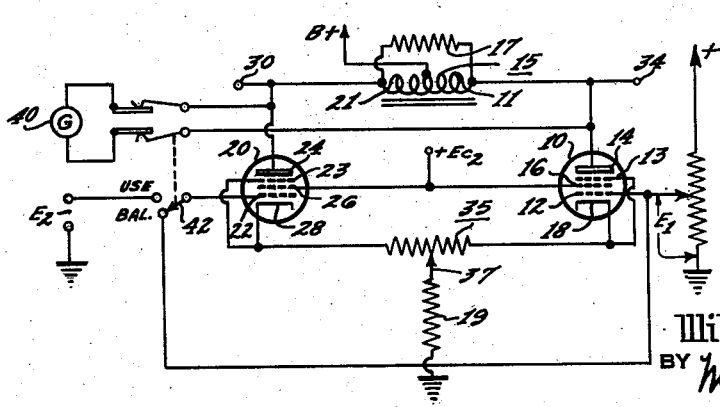
INVENTOR
William R. Ayres
BY
ATTORNEY Patented Apr. 20, 1954

2,676,253

UNITED STATES PATENT OFFICE 2,676,253

ELECTRONIC COMPARING CIRCUIT

William R. Ayres, Oaklyn, N. J., assignor to Radio Corporation of America, a corporation of Delaware Application January 30, 1952, Serial No. 269,007

6 Claims. (Cl. 250—27)

This invention relates to improvements in comparing or coinicidence indicating circuits.

Presently known comparing or coincidence circuits which employ electron tubes require rather complicated circuits for efficient operation. Additional amplification stages are required wherever the comparing or coincidence circuit must give a sharply defined output. Such complicated circuits and extra amplification stages are expensive and require extra maintenance.

Therefore, it is an object of the present invention to provide a novel and improved comparison and coincidence indication apparatus.

A further object of the invention is to provide comparison and coincidence indicating apparatus having a simple circuit.

Still a further object of the present invention is to provide a comparing device which is capable of reliable and efficient operation.

A further object is to provide an inexpensive comparing device.

These and further objects of the present invention are attained by utilizing a saturable reactor to provide an output indication of the difference between two input quantities to be compared.

The core and winding of the saturable reactor are selected so that a small current through the winding causes flux saturation in the core. Consequently, an increase of current beyond what is necessary to saturate the core causes no change in flux, whereas a decrease in current causes a rapid change of flux as the current approaches zero. The saturable reactor winding is connected to the quantities to be compared and to a power supply in a manner such that equality of these quantities in magnitude and position in time causes a null or zero flux condition in the saturable reactor. The amplitude of the output obtained is determined by the rate of change of one or both of the quantities being compared. The output pulse amplitude, accordingly, is proportional to the rate of change of flux through the saturable reactor with respect to time. The maximum rate of change of flux with respect to time can be made to correspond to the point of equality between the two quantities to be compared.

In accordance with a preferred embodiment of the invention wherein it is used as a voltage comparing device, two electron discharge tubes are utilized which have their cathodes connected to a common cathode biasing resistor. Each tube has its anode connected to one end of the saturable reactor. Voltages, to be compared, are separately applied to the grid of each tube. The saturable reactor has a center tap which is connected to the high potential end of a power supply. One of the grid input voltages is varied through a range which encompasses a fixed or standard voltage applied to the other grid. The tubes used are selected to have the same anode-to-cathode impedance when the voltage applied to each control grid is equal to the fixed or standard voltage. Consequently, when the variable voltage attains a value which is equal to the reference voltage value, equal currents are drawn through the tubes and the portions of the saturable reactor windings connecting them to B+. This balance of currents causes a sudden change in the flux through the saturable reactor and results in an output indication at each of the two anodes which is proportional to the rate of change of flux through the saturable reactor with respect to time. If a constant current variation is used, the point of maximum rate of change of flux with respect to time corresponds to the point of equality of the input voltages.

The novel features of the invention as well as the invention itself, both as to its organization and method of operation, will best be understood from the following description when read in connection with the accompanying drawings in which:

Figure 1 is a circuit diagram of a preferred embodiment of the invention,

Figure 2a is a graph of two voltages which are applied to the inputs of the circuit shown in Figure 1, Figure 2b is a graph of the current changes which result from the application of voltages as shown in Figure 2a, Figure 2c is a graph showing the resultant magnetomotive force and flux through the saturable reactor caused by the changes illustrated in Figure 2b.

Figure 2d is a curve showing the rate of change of flux in respect to time for the flux vs. time graph shown in Figure 2c, Figure 3 shows an embodiment of the invention which includes means to preadjust or calibrate the invention, Figure 4 shows an embodiment of the invention which provides a different calibration technique from that shown in Figure 3.

Figure 1 is a circuit diagram of a voltage-comparing device. A first fixed or reference voltage $E_1$ is applied to the control grid 12 of a first pentode 10. The anode 14 of the first pentode 10 is connected to one end of a saturable reactor 15. A second, variable voltage $E_2$ is applied to the control grid 22 of a second pentode 20. The anode 24 of the second pentode 20 is connected to the other end of the saturable reactor 15. The saturable reactor is connected by means of a center tap to B+, and is shunted by a damping resistor 17. The screen grids 16 and 26 of the pentodes are connected together and to a common potential. The voltage applied to the anodes and screen grids is such that current through the pentodes is substantially independent of anode voltage variations throughout the range of grid voltage variations involved. The cathodes of the pentodes 18 and 28 are coupled to a common cathode biasing resistor 19. An output is derived from the anode of the pentode 20 by means of a directly connected terminal 30. The output of the pentode 10 is coupled through a direct-current blocking condenser 32 to a second output terminal 34.

The description which follows hereafter is made with reference to Figures 1, 2a, 2b, 2c, and 2d. The operation is explained with reference to time as a base. All graphs in Figures 2a, 2b, 2c, 2d are plotted with reference to time.

At the start of the comparing operation, designated as $t=0$ in Figure 2a, the first pentode 10 draws a substantial anode current since its grid voltage $E_1$ is much higher than the grid voltage $E_2$ of the second pentode 20. Current passes through the first pentode 10 and also through the common cathode biasing resistor 19, and biases the second pentode 20 beyond cut-off. An unbalance of current through the saturable reactor windings results since a greater current passes through its first branch 11 between the center tap and the anode 14 of the first pentode 10, than passes through the second branch 21 between the center tap and the anode 24 of the second pentode 20. This unbalance of current causes a flux saturation condition as shown by the magnetization curve $\phi$ in Figure 2c. This condition is substantially maintained until the variable voltage $E_2$ applied to the second pentode grid approaches the value of the fixed voltage $E_1$ applied to the first pentode grid. As the variable voltage $E_2$ becomes equal to the fixed voltage $E_1$, the current conditions of the pentodes will begin to interchange due to the push-pull action caused by the common cathode biasing resistor 19. The second pentode current will increase and the first pentode current will decrease.

As the current through the saturable reactor branches approaches a balanced condition, at time $t_1$, where each branch 11 and 12 carries substantially the same current, the flux through the saturable reactor core rapidly decreases. The flux change is sharper than the current changes, as may be seen from Figure 2b by comparing the current changes $i_{p1}$ and $i_{p2}$ for the respective first and second tubes with the flux change in the saturable reactor shown in Figure 2c. This results because of the flux vs. current characteristics of the saturable reactor.

The voltage across each saturable reactor branch is proportional to its inductance times the rate of change of current through it with respect to time or to the rate of change of flux through it with respect to time. The output at the anode of either pentode, during the comparing operation, is equal to the difference between B+ and the voltage drop across the series saturable reactor branch. Thus, the output at the anode 24 of the second pentode 20 decreases by an amount proportional to the rate of change of flux with respect to time through the saturable reactor. An opposite change occurs at the anode 14 of the first pentode since the rate of change of current is negative through the saturable reactor branch in series with this pentode and consequently causes a voltage drop across the saturable reactor branch which adds to the B+ voltage. The output at the second terminal 34 differs from that at the first terminal in that it has no direct current component. Thus, the output, at the point of equality, at the second terminal 34 appears as a positive pulse having a wave form substantially the same as the rate of change of flux with respect to time shown in Figure 2d.

A shunting resistor 17 is placed across the saturable reactor windings in order to prevent unwanted transient oscillations. This resistor is selected so that the saturable reactor is substantially critically damped.

While for many purposes two pentodes of the same type will have sufficiently closely matched impedances over a considerable grid voltage range, it may be desirable to correct any small deviations in order to get a very high degree of accuracy. For this purpose, a means for readjusting or calibrating the invention is shown in Figs. 3 and 4. A potentiometer 35 has the ends of its fixed resistance connected to the cathodes 18 and 28 of the pentodes and has its slider 37 connected to the common cathode resistor 19.

The potentiometer 35 is varied to give the desired impedance match at the point of voltage equality desired. If the pentodes do not have the same dynamic characteristics, then the impedance balance must be made for each voltage level of comparison desired.

There are many possible methods of calibrating the above circuit so that there will be a balance of current through the saturable reactor branches at the point of equality. One method is shown in Figure 3. The circuit is similar to that shown in Figure 1. Corresponding elements are given the same number. A galvanometer 40 is connected between the anodes 14 and 24 of the first and second pentodes. A potentiometer 35 is used to match the pentode impedances and is connected as explained above. A "use-balance" switch 42 is provided. In the "Bal." position, the fixed reference potential $E_1$ is applied to both control grids 12 and 22 and the galvanometer is connected. In the "Use" position the variable voltage $E_2$ is applied to the control grid of the second pentode and the galvanometer 40 is disconnected. The saturable reactor winding is center tapped and connected to B+ as in Figure 1.

With the above connections and the "use-balance" switch in the "Bal." position, the galvanometer is connected in a conventional bridge circuit. Potential is applied to two branches, each having a section of the saturable reactor, a pentode, and part of the potentiometer 35 in series. The slider of the potentiometer is adjusted until the galvanometer reads zero. The circuit is thus calibrated such that in the "Use" position a balance of flux occurs in the saturable reactor when the variable voltage $E_2$ becomes equal to the fixed voltage $E_1$.

Where the sections of the center tapped saturable reactor do not have equal impedances, appropriate correction must be made such as is shown in Figure 4. Separate equalizing resistors 36 and 38 are connected to one end of each saturable reactor section. Both equalizing resistors are connected to B+. The galvanometer 40 is connected between the junctions of the calibrating resistors and the respective saturable reactor sections. The potentiometer 35 and switch 32 are connected and used as above to calibrate the circuit.

A linear variation of either or both of the voltages to be compared is preferred since any other variation will shift the maximum point of the graph of the rate of change of flux in respect to the time to the right or left of the point of input equality. Any other current variation may be used, however, if a suitable correction is made.

It is not necessary that input voltages be compared to find a point of equality. The invention may be utilized to find any desired ratio between two input voltages. If the ratio of the first voltage to the second which is desired is R, the tubes must be calibrated to have an impedance ratio, first to second, of 1/R and the ratio of the turns of first saturable reactor section to the second saturable reactor section must be made equal to 1/R so that the zero flux condition will occur when the current through the first saturable reactor section is 1/R times that of the second saturable reactor section.

It should be noted that the invention is not limited to voltage comparison but may be used to compare any electrical quantities which can be represented by proportional voltages.

The invention may be used as either a comparator which compares input amplitudes or as a coincidence indicator which compares the time position of two inputs. Time coincidence of two voltages having equal amplitudes is indicated by an absence of an output when the two voltages are suddenly applied to respective inputs. Any deviation from exact coincidence in time or amplitude causes an output pulse which, as described above, is proportional to the rate of change of flux in respect to time.

In the operative embodiment of the invention shown in Figure 1, the following values for the components were used. These values are given for purposes of illustration and are not to be construed as a limitation thereon.

The saturable reactor is center-tapped with 4,000 turns in each half. The core used was a one-quarter inch stack of .014 inch thick Allegheny EE-24-25 Mumetal laminations. The core was stacked with 100% interleaved laminations.

Tubes 10 and 20 are type 6AU6
Common cathode resistor 19=6800 ohms
Screen grid voltage=140 v. to ground
$E_1$=40 v.
B+=280 v.
Saturable reactor shunting resistor 17=820,000 ohms From the foregoing description, it will be readily appreciated that the invention provides a simple comparing or coincidence indicating circuit which is capable of giving a sharply defined output responsive to the difference between the two input quantities to be compared.

I claim:

1. In combination, a first electron discharge tube having at least a cathode, an anode, and a control grid, means to apply a first voltage to the control grid of said first tube, a second electron discharge tube having at least an anode, a cathode, and a control grid, means to apply a second voltage to be compared to said first voltage to the control grid of said second electron discharge tube, a saturable reactor having a single core and a winding with a first and a second section on said core, one end of said first section being connected to the anode of said first and one end of said second section being connected to the anode of said second tube, a cathode bias resistor to which the cathodes of said first and second tubes are connected, means to apply operating potential to the other ends of said saturable reactor sections and said cathode bias resistor, and means to derive an output from the anodes of said tubes, proportional to the rate of change of flux through said saturable reactor with respect to time.

2. An electronic comparing system comprising, a first and a second electron discharge tube each having an anode, a cathode, and a control grid, a cathode bias resistor to which the cathodes of said first and second tubes are connected, a saturable reactor having a single core and a winding thereon, a connection between one end of said saturable reactor winding and the anode of said first tube, a connection between the other end of said saturable reactor winding and the anode of said second tube, means to apply operating potential to a point intermediate the ends of said saturable reactor winding and to said common cathode bias resistor, means to apply a reference voltage to the control grid of said first tube, means to apply a variable voltage to be compared with said reference voltage to the control grid of said second tube, and means to derive an output from the anodes of said tubes which is proportional to the rate of change of flux through said saturable reactor with respect to time.

3. A voltage comparing device comprising a first electron discharge tube having at least a cathode, an anode, and a control grid, means to apply a fixed voltage to the control grid of said first tube, a second electron discharge tube having at least a cathode, an anode, and a control grid, means to apply a variable voltage to be compared to said fixed voltage to the control grid of said second tube, a saturable reactor having a single core and a winding thereon with a center tap and two ends, a connection between one end of said saturable reactor winding and the anode of said first tube, a connection between the other end of said saturable reactor winding and the anode of said second tube, means to apply operating potential to the center tap of said saturable reactor winding, a cathode bias resistor, means coupling the cathodes of said tubes to said cathode bias resistor, means to balance the currents drawn through said first and second tubes when a voltage equal to said fixed voltage is applied to the control grid of each tube to provide a null flux condition in said saturable reactor, and means to derive an output from the anodes of said tubes when said null flux condition occurs.

4. A voltage comparing device as recited in claim 3 wherein the means coupling the cathodes to the cathode bias resistor includes a potentiometer having two ends and a slider, one of said potentiometer ends being connected to the cathode of said first tube and the other of said ends being connected to the cathode of said second tube, said potentiometer slider being connected to the cathode bias resistor; and wherein said means to balance the currents drawn through said first and second tubes includes said potentiometer and a galvanometer having two terminals, one terminal being connected to the anode of said first tube and the other terminal being connected to the anode of said second tube, whereby the circuit is calibrated by positioning the slider of said potentiometer such that no current flows through galvanometer when said fixed voltage is applied to the control grids of said first and said second tubes.

5. A voltage comparing device comprising, a first electron discharge tube having at least an anode, a cathode, and a control grid, means to apply a fixed reference voltage to the control grid of said first tube, a second electron discharge tube having at least an anode, a cathode, and a control grid, means to apply a variable voltage to the control grid of said second tube, a saturable reactor including windings having a first and a second section each having two ends and being wound around a common core, said first section having a first end connected to the anode of said first tube, said second section having a first end connected to the anode of said second tube, a source of operating potential, two calibrating resistors, one of said calibrating resistors connecting the second end of said first section to said source of operating potential, the other of said calibrating resistors connecting the second end of said second section to said source of operating potential, said calibrating resistors being selected such that the sections in series with respective calibrating resistors have equal impedances, said sections being positioned around said common core such that equal currents through said sections cause a null flux condition through said saturable reactor, a potentiometer having two ends and a slider, one end of said potentiometer being connected to the cathode of said first tube and the other end being connected to the cathode of said second tube, a cathode bias resistor connected between the slider of said potentiometer and said cathode bias resistor, a galvanometer connected between the second ends of said sections, said potentiometer slider being positioned in order that no current flows through said galvanometer when a voltage equal to said fixed voltage is applied to the grid of said first tube and to the grid of said second tube, and means to derive an output from the anodes of said first and second tubes proportional to the rate of change of flux through said saturable reactor with respect to time.

6. A voltage comparing device as recited in claim 5 wherein a damping resistor is connected between said first ends of said saturable reactor sections, whereby undesirable transient oscillations are prevented.

References Cited in the file of this patent

UNITED STATES PATENTS

| Number | Name | Date |
|---|---|---|
| 2,410,669 | Lynn | Nov. 5, 1946 |
| 2,559,513 | Palmer | July 3, 1951 |